June 7, 1955

J. LASER 2,710,356

DEVICE FOR LIMITING THE PRIMARY CURRENT WHEN
BRINGING A TRANSFORMER INTO CIRCUIT

Filed Feb. 26, 1952

INVENTOR
Jakob Laser
By Fred M Vogel
Agent

United States Patent Office 2,710,356
Patented June 7, 1955

2,710,356

DEVICE FOR LIMITING THE PRIMARY CURRENT WHEN BRINGING A TRANSFORMER INTO CIRCUIT

Jakob Laser, Solna, Sweden, assignor to Hartford National Bank and Trust Company, Hartford, Conn., as trustee Application February 26, 1952, Serial No. 273,479

Claims priority, application Sweden March 17, 1951

5 Claims. (Cl. 307—93)

The present invention relates to a device for limiting the primary current when bringing a transformer into circuit. The current of the primary of a transformer in an X-ray equipment or of a welding transformer when switching-on the equipment may flow in heavily varying amounts depending on the magnetic state of the core when switching-on the device and the phase position in the A. C. cycle at which the switching-on occurs. The initial current may rise to very high values and the factors determining this current are well-known as is the fact that the effects of such currents on transformers and other circuit elements may be detrimental as well from an electrical as from mechanical point of view.

The current peaks occurring when putting the transformer into circuit may be particularly troublesome for equipments where loads of short duration are applied to the transformer at short intervals. Loads of this kind are schematically shown in Fig. 1a which shows the primary voltage during a series of short switchings, which in this figure are shown as containing each 1.5 cycle of the line frequency. When putting a device into circuit in this manner, i. e. where the voltage curve at the beginning of the switching has a course which by 180° deviates from the voltage course at the end of the prior switching, the primary current will be very high. In order to avoid this disadvantage it has been earlier proposed to bring the transformer into circuit by means of controlled electron tube devices in such a way that the circuit is closed in the same phase position of the voltage curve as it was opened at the previous working period in the manner shown in Fig. 1b, the switch thus being controlled in such a way that the polarity of the first half cycle alternates from switching to switching. The means necessary for carrying out this alternating switching of the device are however fairly complicated and furthermore the initial magnetic state from which the transformer starts may vary considerably from switching to switching with corresponding variations of the amplitudes of the initial current.

The disadvantages mentioned are avoided according to the invention by means of a device comprising means known per se for bringing the primary of the transformer into circuit (e. g. by means of an accurately operating relay, ignitrons or the like) near to the zero point of the primary voltage which is characterised in that it is provided with means for applying a direct-current to a winding of the transformer before a switching-in of the transformer. This direct current is given a magnitude so that a high induced voltage (opposing e. m. f.) is obtained at the following switching-in of the alternating current, which is made during a part of the cycle, in which the voltage variation has a direction, which with respect to the premagnetization of the core obtained by means of the direct current gives the desired low initial current.

For a better understanding of the invention, reference is made to the following detailed description thereof to be read in conjunction with the annexed drawing wherein.

Figure 1A:
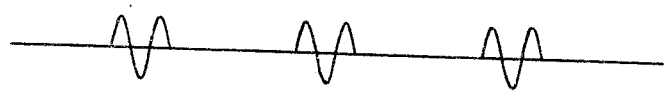
Fig. 1a and Fig. 1b are curves explanatory of the invention.
Figure 1B:
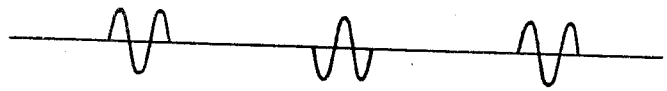

The device is preferably made such that the current when bringing the transformer into circuit always has a predetermined direction, the pre-magnetisation of the core, which is brought about between the switching-ins also being applied in one and the same direction. This switching-in of the primary voltage corresponds to Fig. 1a.

Figure 2:
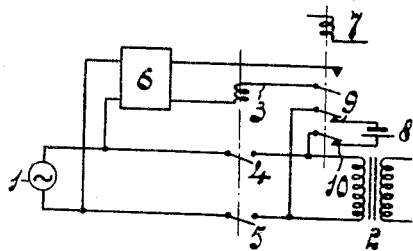
Fig. 2 is a schematic diagram of one preferred embodiment of the invention.

Referring now to Fig. 2 there is shown an example of a relay-controlled device according to the invention. In this figure only the current source, the transformer and the means for bringing the transformer into circuit are shown.

The current source is indicated by 1, the transformer by 2 and a switch relay by 3. This switching relay is provided with contacts 4 and 5 and is controlled by a voltage responsive means 6 so that the contacts 4 and 5 are closed in a predetermined phase position of the primary voltage and opened at the end of a half cycle, the voltage of which has the same polarity as the one in which the transformer is brought into circuit. A further relay 7 which is actuated in a circuit not shown in the figure when the transformer has to be brought into circuit closes the circuit through the winding of the relay 3 and opens contacts 9 and 10 for a direct current path through a transformer winding. When the relay 7 releases at the end of a switching a winding of the transformer, in the case shown the primary, is connected to a direct current source 8 connected to the contacts 9 and 10 and a direct current flows through the primary thus giving the core the desired pre-magnetisation.

As the resistance of the primary usually is very low it is also necessary that the current source 8 has a comparatively low voltage. It is obvious that the secondary as well may be used for giving the transformer core an appropriate pre-magnetisation. For transformers with high secondary voltage, however, the switching means has to be dimensioned for these high voltages. For transformers with low secondary voltage as for instance welding transformers it may be desirable to obtain the premagnetisation by means of the secondary.

Figure 3:
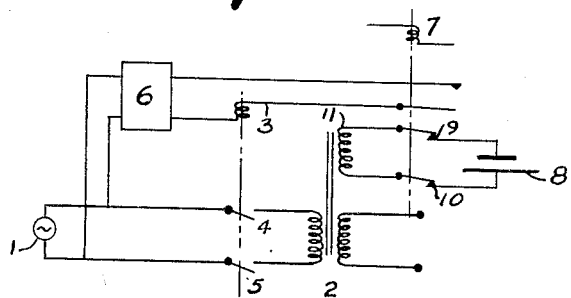
Fig. 3 is a schematic diagram of another preferred embodiment thereof.

In some cases it may be of advantage to arrange a separate magnetisation as shown in Fig. 3 wherein the direct voltage is applied to the tertiary winding 11 surrounding the core of transformer 2, the circuit otherwise being identical to that in Fig. 2 winding for the D. C. magnetisation. The devices shown in the figures are obviously only to be considered as schematical examples and many different modifications could be applied without leaving the scope of the invention. The control of the switching-in of the D. C. magnetisation can be obtained in several ways, e. g. by means of the same device 6 which controls the switching of the alternating voltage to the transformer. It may also be suitable to arrange for special means for limiting the period during which the direct current is applied to the transformer. Automatic devices for determining the desired switching periods and for the control of the switching which may be made in several different ways are not shown in the figure as not being subject of the invention proper.

What I claim is:

1. In a system wherein an alternating voltage supply is connected via an off-on switching member to the primary of a transformer having a magnetizable core and a secondary which is connected to a load, a device for limiting current flow in said primary when switching on said member comprising means to premagnetize said transformer core in a given direction, and means to cut-off said premagnetization means when switching on said member.

2. In a system wherein an alternating voltage supply is connected via an off-on switching member to the primary of a transformer having a magnetizable core and a secondary which is connected to a load, a device for limiting current flow in said primary comprising means to actuate said member to connect said primary to said alternating voltage supply at an instant near the zero value in the alternating cycle of primary voltage, means including a direct voltage source to premagnetize said transformer core in a given direction, and means to cut-off said premagnetization means upon actuating said member.

3. A device, as set forth in claim 1, wherein said premagnetization means includes a direct current source coupled to said primary winding.

4. A device, as set forth in claim 1, further including a tertiary winding surrounding said core, said premagnetization means including a direct current source coupled to said winding.

5. In combination, an alternating current supply, a transformer provided with a magnetizable core, a primary winding and a secondary winding, a first relay having an electromagnet and a normally open switching member actuated thereby, said member connecting said supply to said primary, said secondary being connected to a load, a voltage responsive device connected to the electromagnet of said first relay and coupled to said supply for energizing said electromagnet when the voltage of said supply is near the zero value in the alternating cycle, a second relay provided with an electromagnet, a first normally open switch and a second normally closed switch actuated by said electromagnet, said first switch interposed between said device and said first electromagnet, a direct current source, means connecting said source through said second switch to one of said windings to premagnetize said core, and means to energize the electromagnet of said second relay whereby closure of said first relay electromagnet and the concurrent opening of said second switch cuts-off the premagnetization of said core.

References Cited in the file of this patent

UNITED STATES PATENTS

| | | |
|---|---|---|
| 1,820,808 | Kearsley | Aug. 25, 1931 |
| 2,519,425 | Barlow | Aug. 22, 1950 |